United States Patent
Ito et al.

(10) Patent No.: US 7,294,968 B2
(45) Date of Patent: Nov. 13, 2007

(54) SIGNAL TRANSMISSON SYSTEM AND VEHICULAR LAMP

(75) Inventors: Masayasu Ito, Shizuoka (JP); Hitoshi Takeda, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 71 days.

(21) Appl. No.: 11/079,429

(22) Filed: Mar. 14, 2005

(65) Prior Publication Data

US 2005/0200287 A1 Sep. 15, 2005

(30) Foreign Application Priority Data

Mar. 15, 2004 (JP) ............................. 2004-073596

(51) Int. Cl.
*B60Q 1/02* (2006.01)
(52) U.S. Cl. ..................... 315/82; 315/291; 307/10.8
(58) Field of Classification Search ................ 315/312, 315/291, 219, 209 R, 77, 82, 224–226, 307–308; 307/10.1, 10.8
See application file for complete search history.

(56) References Cited

U.S. PATENT DOCUMENTS

| | | | | |
|---|---|---|---|---|
| 6,002,215 | A * | 12/1999 | Yamashita et al. | 315/308 |
| 6,392,364 | B1 * | 5/2002 | Yamamoto et al. | 315/291 |
| 7,205,680 | B2 * | 4/2007 | Takeda et al. | 307/10.8 |
| 2002/0047531 | A1 * | 4/2002 | Sugimoto et al. | 315/82 |
| 2003/0117088 | A1 * | 6/2003 | Tanabe et al. | 315/291 |
| 2004/0066154 | A1 * | 4/2004 | Ito et al. | 315/291 |
| 2004/0183476 | A1 * | 9/2004 | Ishizuka | 315/291 |

FOREIGN PATENT DOCUMENTS

JP 2002-231013 8/2002

OTHER PUBLICATIONS

Patent Abstracts of Japan, Publication No. 2002-231013 dated Aug. 16, 2002, 1 page.

* cited by examiner

*Primary Examiner*—Douglas W. Owens
*Assistant Examiner*—Tung X Le
(74) *Attorney, Agent, or Firm*—Osha Liang LLP

(57) ABSTRACT

There is provided a vehicular lamp that can be miniaturized by reducing signal lines connected to a vehicle main body. The vehicular lamp that is used for a vehicle includes a light source unit, and a signal line that connects the light source unit and a light source controlling unit for controlling lighting of the light source unit, in which the light source unit includes: a semiconductor light-emitting element; an optical member that irradiates light emitted from the semiconductor light-emitting element to the outside of the vehicle; a lighting controlling unit to which electric power is supplied from a vehicle main body and that control an electric current supplied to the semiconductor light-emitting element according to a voltage applied to the signal line by the light source controlling unit in order to control a light amount of the semiconductor light-emitting element; a current detecting resistor that is connected to the semiconductor light-emitting element in series; a current driving resistor that is connected to the signal line in series; and a comparator that sinks the current flowing into the current driving resistor and the same signal line as the signal line when a voltage is generated on the current detecting resistor by the current flowing into the semiconductor light-emitting element.

12 Claims, 4 Drawing Sheets

SIGNAL TRANSMISSON SYSTEM AND VEHICULAR LAMP

This patent application claims priority from a Japanese Patent Application No. 2004-073596 filed on Mar. 15, 2004, the contents of which are incorporated herein by reference.

BACKGROUND OF THE INVENTION

1. Field of the Invention

The present invention relates to a signal transmission system and a vehicular lamp.

2. Description of Related Art

In late years, a vehicular lamp that uses a semiconductor light-emitting element such as an LED (Light Emitting Diode) for a light source is known as disclosed, for example, in Japanese Patent Laid-Open No. 2002-231013 (see pages 2 to 6 and FIGS. 1 to 13). For safety reasons, when a light source of a vehicular lamp breaks, the vehicle informs a driver of that effect and prompts the driver for replacement of the light source. In addition, when the speed of a vehicle is fast, the vehicle increases a light amount of the light source more than it drives slowly. In this way, the front of the vehicle becomes brighter and safety of vehicle traveling is increased, in some cases.

In order to detect disconnection of a light source by a vehicle main body, a signal line, which transmits a signal to indicate disconnection of the light source from a vehicular lamp to the vehicle main body, is required. In addition, when a light amount of the light source is controlled, a signal line, which transmits a control signal from the vehicle main body to the vehicular lamp, is required. Therefore, since the number of cables connected to the vehicular lamp increases, there has been a problem that the vehicular lamp is not miniaturized in some cases. In addition, due to an increase of the number of cables, there has been a problem that it takes a long time to mount the vehicular lamp to the vehicle in some cases.

SUMMARY OF THE INVENTION

Therefore, it is an object of the present invention to provide a signal transmission system and a vehicular lamp that can solve the foregoing problems. The above and other objects can be achieved by combinations described in the independent claims. The dependent claims define further advantageous and exemplary combinations of the present invention.

According to the first aspect of the present invention, there is provided a signal transmission system that transmits a signal. The signal transmission system includes: a first device; a second device; and a signal line that connects the first device and the second device, in which the first device sends a signal to the second device using a voltage applied to the signal line, and the second device sends a signal to the first device using an electric current flowing into the same signal line as the signal line.

One of the first device and the second device may have a load unit that is driven by electric power received from the outside of the signal transmission system, and the load unit may change a consumption current according to the signal received from the other of the first device and the second device via the signal line.

The second device may have the load unit, the load unit may change the consumption current according to the voltage applied from the first device to the signal line, and the second device may send an electric current according to the consumption current of the load unit to the first device via the signal line as the signal.

The load unit may include: a semiconductor light-emitting element; and a lighting controlling unit that controls an electric current supplied to the semiconductor light-emitting element according to the voltage applied to the signal line in order to control a light amount of the semiconductor light-emitting element, the second device may include: a current detecting resistor that is connected to the semiconductor light-emitting element in series; a current driving resistor that is connected to the signal line in series; and a comparator that sinks the current flowing into the signal line according to the voltage generated on the current detecting resistor by the current flowing into the semiconductor light-emitting element.

The current driving resistor may be a thermistor that changes a resistance value according to temperature, and may be disposed in the vicinity of the semiconductor light-emitting element.

In addition, the first device may supply electric power to the second device via the signal line to drive the second device.

Further, the second device may supply electric power to the first device via the signal line to drive the first device.

According to the second aspect of the present invention, there is provided a vehicular lamp that is used for a vehicle. The vehicular lamp includes: a light source unit; and a signal line that connects the light source unit and a light source controlling unit for controlling lighting of the light source unit, in which the light source unit includes: a semiconductor light-emitting element; an optical member that irradiates light emitted from the semiconductor light-emitting element to the outside of the vehicle; a lighting controlling unit to which electric power is supplied from a vehicle main body and that control an electric current supplied to the semiconductor light-emitting element according to a voltage applied to the signal line by the light source controlling unit in order to control a light amount of the semiconductor light-emitting element; a current detecting resistor that is connected to the semiconductor light-emitting element in series; a current driving resistor that is connected to the signal line in series; and a comparator that sinks the current flowing into the current driving resistor and the same signal line as the signal line when a voltage is generated on the current detecting resistor by the current flowing into the semiconductor light-emitting element.

In addition, the vehicular lamp may include a plurality of light source units, the light source controlling unit may control lighting of each of the plurality of light source units, and the signal line may connect each of the plurality of light source units and the light source controlling unit in the vehicular lamp.

The summary of the invention does not necessarily describe all necessary features of the present invention. The present invention may also be a sub-combination of the features described above.

BRIEF DESCRIPTION OF THE DRAWINGS

The above and other objects and features and advantages of the present invention will become more apparent from the following description of the presently preferred exemplary embodiments of the invention taken in conjunction with the accompanying drawings, in which.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
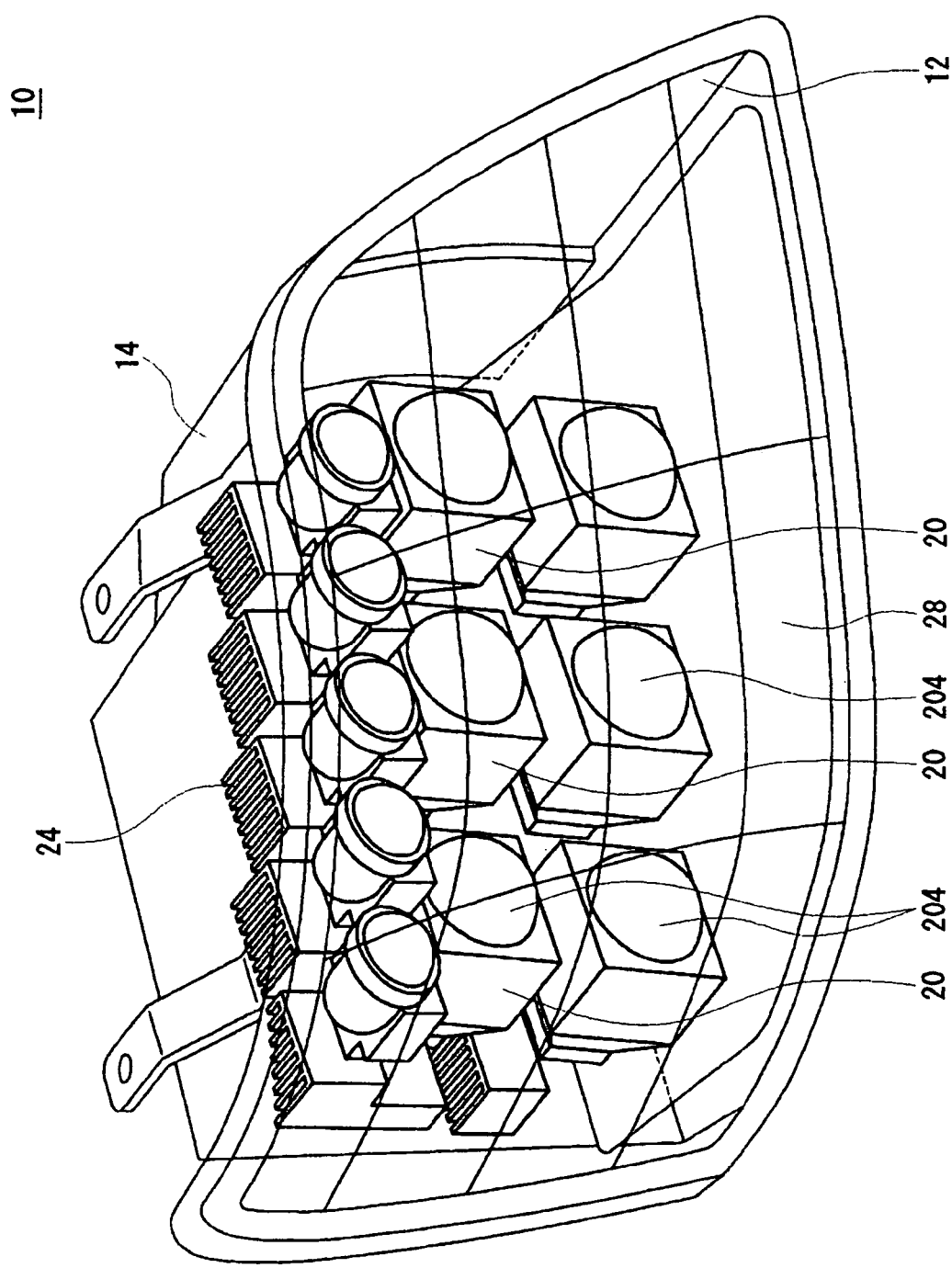
FIG. 1 is a perspective view of a vehicular lamp.
Figure 2:
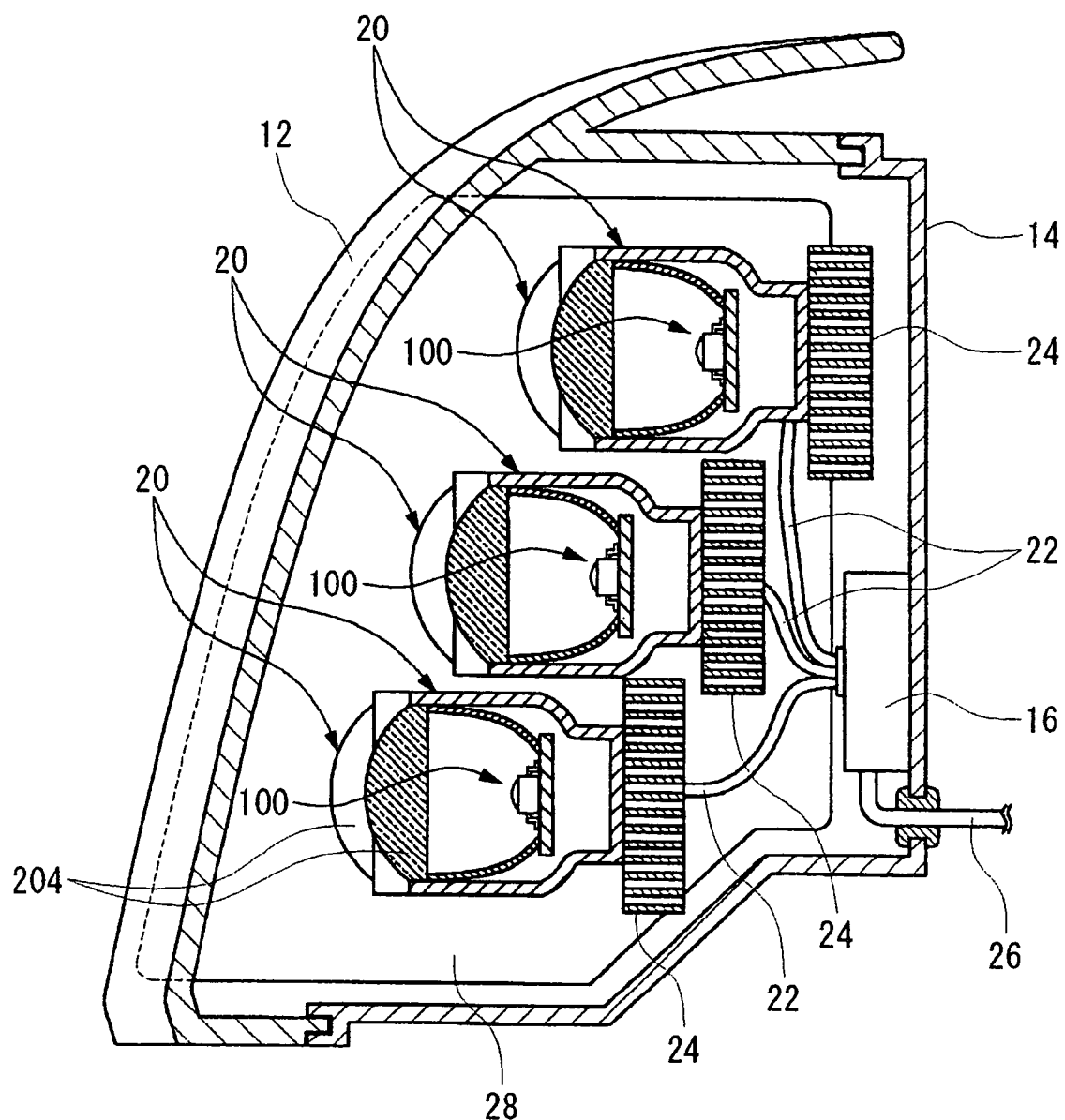
FIG. 2 is a horizontal sectional view of the vehicular lamp.

FIGS. 1 and 2 show views exemplary showing a configuration of a vehicular lamp 10 according to an embodiment of the present invention. FIG. 1 is a perspective view of the vehicular lamp 10. FIG. 2 is a horizontal sectional view of the vehicular lamp 10 by a horizontal plane that traverses a light source unit 20 in the middle stage. The object of the present embodiment is to provide a vehicular lamp 10 that can reduce the number of signal lines and thus can be miniaturized by transmitting a plurality of signals through one signal line. The vehicular lamp 10 is a headlight (a head lamp) for a vehicle, and irradiates light ahead of a vehicle such as an automobile. The vehicular lamp 10 includes a plurality of light source units 20, a cover 12, a lamp body 14, a circuit unit 16, a plurality of heat dissipation members 24, an extension reflector 28, and cables 22 and 26.

Each of the plurality of light source units 20 has an LED module 100 and a lens 204. The LED module 100, which is an example of a semiconductor light-emitting element of the present invention, emits white light according to electric power received from the circuit unit 16 through the cable 22. The lens 204, which is an example of an optical member of the present invention, irradiates the light emitted from the LED module 100 to the outside of the vehicular lamp 10. In this way, the light source unit 20 irradiates light forming a part of a light distribution pattern of the vehicle ahead of the vehicle based on the light emitted from the LED module 100. The light source units 20 are supported on the lamp body 14 so that the light source units 20 can be tilted, e.g., by means of an aiming mechanism for adjusting the direction of optical axis of the light source units 20. The light source units 20 may be supported on the lamp body 14 so that the direction of optical axis when the vehicular lamp 10 is attached to a vehicle main body heads downward, e.g., by about 0.3 to 0.6°.

In addition, the plurality of light source units 20 may have the same or similar light distribution characteristics, or may have the light distribution characteristic different from one another. Further, in another example, one light source unit 20 may have the plurality of LED modules 100. The light source unit 20 may have, e.g., a semiconductor laser instead of the LED module 100 as a light source.

The cover 12 and the lamp body 14 form a light room of the vehicular lamp 10, and accommodate the plurality of light source units 20 within the light room. It is preferable that the cover 12 and the lamp body 14 seal and protect the light source units 20 from water. The cover 12 is formed of a material that transmits light emitted from the LED module 100, e.g., in the transparent shape, and is provided in the front face of the vehicle so as to cover the front of the plurality of light source units 20. The lamp body 14 is provided to face the cover 12 holding the plurality of light source units 20 therebetween in order to cover the plurality of light source units 20 from the rear. The lamp body 14 may integrally be formed with a body of the vehicle.

The circuit unit 16 is a module in which a light source controlling unit for lighting the LED module 100 is formed. The circuit unit 16 is electrically connected to the light source units 20 via the cables 22. In addition, the circuit unit 16 is electrically connected to the vehicle main body in the outside of the vehicular lamp 10 via the cable 26. Further, the cables 22 are an example of a signal line of the present invention.

The plurality of heat dissipation members 24 is a heat sink that is provided to be in contact with at least a part of the light source unit 20. The heat dissipation member 24 is formed of a material such as metal having thermal conductivity higher than that of air. The heat dissipation members 24 are movable with the light source units 20 within a scope that moves the light source units 20, e.g., as against a supporting point of an aiming mechanism, and are provided at intervals enough to adjust an optical axis of the light source units 20 as against the lamp body 14. The plurality of heat dissipation members 24 may integrally be formed of one metallic component. In this case, it is possible to efficiently radiate heat from the whole of the plurality of heat dissipation members 24.

The extension reflector 28 is a reflecting mirror that is formed of, e.g., a thin metal plate from the bottom of the plurality of light source units 20 to the cover 12. Since the extension reflector 28 is formed to cover at least a part of the inside of the lamp body 14, the extension reflector 28 hides a shape of the inside of the lamp body 14 and thus improves an appearance of the vehicular lamp 10.

In addition, at least a part of the extension reflector 28 contacts with the light source unit 20 and/or the heat dissipation member 24. In this case, the extension reflector 28 has a function of a thermal conduction member that conducts heat generated from the LED module 100 to the cover 12. In this way, the extension reflector 28 radiates heat from the LED module 100. Further, a part of the extension reflector 28 is fixed to the cover 12 or the lamp body 14. The extension reflector 28 may be formed in the shape of the frame covering the upper side, the lower side, and the lateral side of the plurality of light source units 20.

According to this example, it is possible to miniaturize the light source unit 20 by using the LED module 100 as a light source. In this way, for example, since a degree of freedom is also improved in relation to arrangement of the light source units 20, it is possible to provide the vehicular lamp 10 having a good design.

Figure 3:
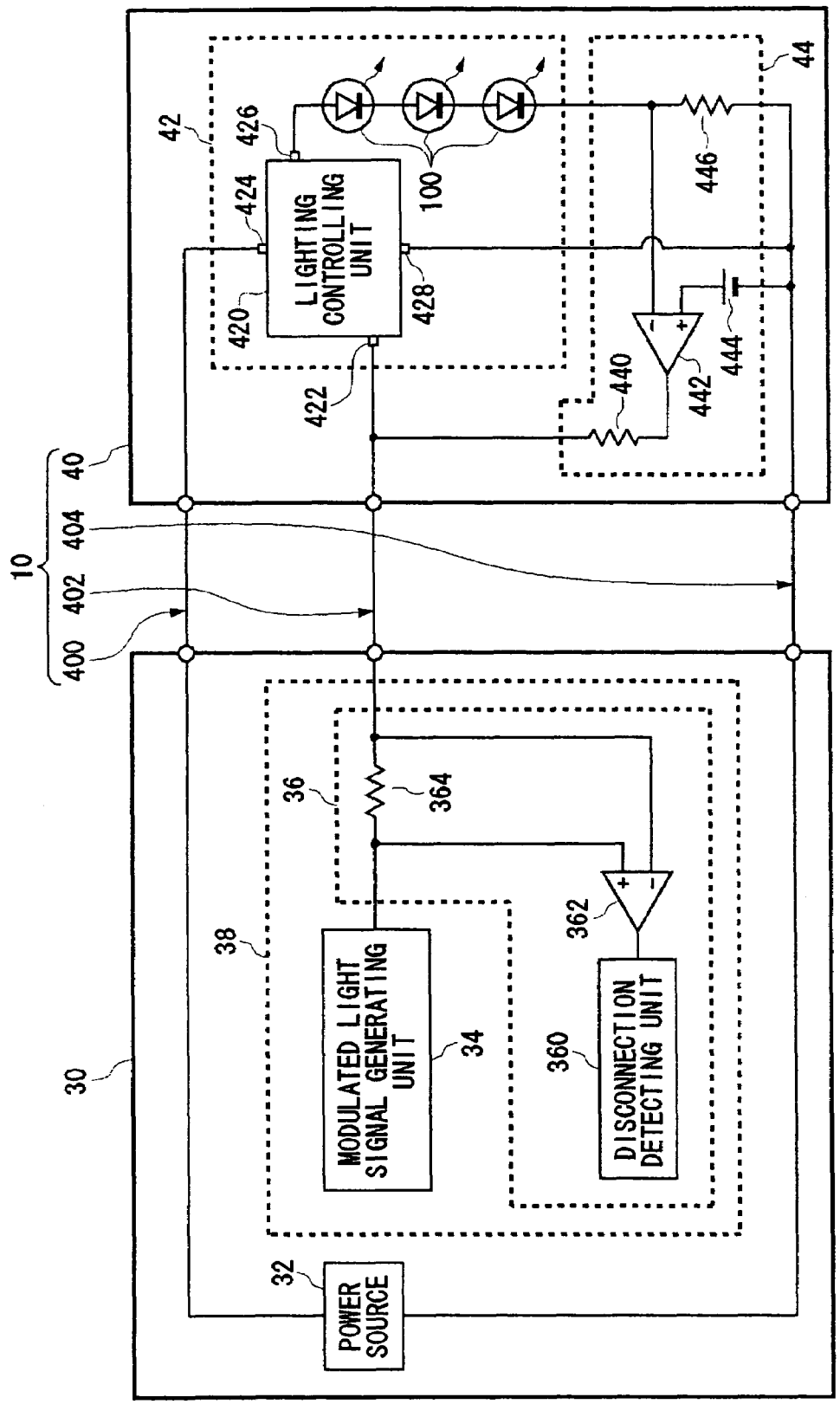
FIG. 3 is a view exemplary showing a circuit configuration of the vehicular lamp along with a vehicle main body.

FIG. 3 is a view exemplary showing a circuit configuration of the vehicular lamp 10 along with a vehicle main body 30. The vehicle main body 30 includes a power source 32 and a control unit 38. The power source 32 is, e.g., a battery in-vehicle, and supplies a predetermined electric power to the vehicular lamp 10. The control part 38 transmits a control signal to the vehicular lamp 10 using DC voltage. In addition, the control unit 38 receives a signal from the vehicular lamp 10 using DC electricity.

The vehicular lamp 10 includes a vehicular lamp main body 40, a control cable 402, and a plurality of power cables 400 and 404. The plurality of power cables 400 and 404 connects the power source 32 and the vehicular lamp main body 40, and transmits electric power received from the power source 32 to the vehicular lamp main body 40. The power cable 400 connects a positive electrode of the power source 32 and a positive terminal of the vehicular lamp main body 40, and the power cable 404 connects a negative electrode of the power source 32 and a reference potential terminal of the vehicular lamp main body 40. The control cable 402 that is an example of a signal line in the present invention connects the control unit 38 and the vehicular lamp main body 40, and transmits a control signal of the control unit 38 to the vehicular lamp main body 40 and also a signal from the vehicular lamp main body 40 to the control unit 38.

The vehicular lamp main body 40 includes a load unit 42 and a current driving unit 44. The load unit 42 receives electric power from the power source 32 through the power cables 400 and 404. The load unit 42 includes a lighting controlling unit 420 and the plurality of LED modules 100. In addition, the load unit 42 may include a lighting controlling unit 420 and one LED module 100. The plurality of LED modules 100 is serially connected to one another. The lighting controlling unit 420 has a plurality of terminals 422, 424, 426, and 428. The lighting controlling unit 420 receives electric power from the terminals 424 and 428 through the power cables 400 and 404. Further, the lighting controlling unit 420 receives DC voltage applied to the control cable 402 by the control unit 38 through the terminal 422. Then, the lighting controlling unit 420 controls an electric current supplied to the plurality of LED modules 100 via the terminal 426 according to the DC voltage received through the terminal 422. In this way, the lighting controlling unit 420 controls a light amount of the LED modules 100 according to the DC voltage applied to the control cable 402 by the control unit 38. Thus, the load unit 42 changes consumption current according to the DC voltage applied to the control cable 402 by the control unit 38.

The current driving unit 44 includes a resistor 440, a comparator 442, a constant voltage source 444, and a resistor 446. The resistor 446 that is an example of a current detecting of the present invention is serially connected between a lower end of the plurality of LED modules 100 connected serially and reference potential, and generates a voltage according to a current flowing into the LED modules 100. The resistor 440 that is an example of a current driving resistor of the present invention is serially connected between the control cable 402 and an output terminal of the comparator 442. The comparator 442 receives a predetermined voltage from the constant voltage source 444 through a positive input terminal, and receives the voltage generated on the resistor 446 through a negative input terminal. When the LED module 100 is lighted, the constant voltage source 444 supplies a voltage lower than that generated on the resistor 446 by means of an electric current flowing into the LED module 100, e.g., about half of the voltage of the resistor 446, to the positive input terminal of the comparator 442.

An output terminal of the comparator 442 is open-collector. When the voltage input to the negative input terminal is higher than that input to the positive input terminal, the comparator 442 sinks the current from the output terminal to reference potential. In addition, when the voltage input to the negative input terminal is lower than that input to the positive input terminal, the comparator 442 keeps the output terminal high impedance.

Here, when the LED module 100 is lighted, a voltage is generated on the resistor 446 by means of a current flowing into the LED module 100. In this way, the comparator 442 sinks the current flowing into the control unit 38 through the control cable 402 and the resistor 440. In addition, when either of the plurality of LED modules 100 is disconnected, the current does not flow into the resistor 446. In this way, the comparator 442 keeps the output terminal high impedance. Therefore, the current flowing into the control cable 402 when the LED module 100 is disconnected becomes smaller than that flowing into the control cable 402 when the LED module 100 is not disconnected. In this way, since the current driving unit 44 drives the current flowing into the control unit 38 via the control cable 402 according to consumption current of the LED module 100, a signal to indicate presence or absence of disconnection of the LED module 100 can be sent to the control unit 38 using DC electricity. In addition, the load unit 42 and the current driving unit 44 are provided in each of the plurality of light source units 20 included in the vehicular lamp 10.

The control part 38, which is an example of a light source controlling unit of the present invention, includes a modulated light signal generating unit 34 and a signal detecting unit 36. The signal detecting unit 36 includes a disconnection detecting unit 360, an actuation amplifier 362, and a resistor 364. The resistor 364 is serially connected between the control cable 402 and the modulated light signal generating unit 34. The actuation amplifier 362 detects a potential difference on both ends of the resistor 364. When the potential difference in the resistor 364 detected by the actuation amplifier 362 is smaller than a predetermined value, the disconnection detecting unit 360 detects which of the plurality of LED modules 100 is disconnected. The predetermined value may be, e.g., a value to indicate a medium potential difference between a potential difference generated in the resistor 364 when the LED module 100 is not disconnected and a potential difference generated in the resistor 364 when the LED module 100 is disconnected. In this way, the signal detecting unit 36 receives a signal from the vehicular lamp main body 40 by detecting the current flowing into the control cable 402.

The modulated light signal generating unit 34 applies a modulated light signal to adjust a light amount of the LED module 100 to the terminal 422 of the lighting controlling unit 420 through the resistor 364 and the control cable 402 using DC voltage. In this example, the lighting controlling unit 420 turns off the LED module 100 when the modulated light signal generating unit 34 applies 0V to the control cable 402, and turns on the LED module 100 by supplying a current according to DC voltage received through the control cable 402 to the LED module 100 when the modulated light signal generating unit 34 applies DC voltage more than 0V to the control cable 402. In this way, when the vehicular lamp 10 of which each of the plurality of LED modules 100 is not disconnected is attached to the vehicle main body 30, the control unit 38 can detect that a potential difference higher than a predetermined value is generated in the resistor 364 when the voltage that turns on the LED module 100 is applied to the lighting controlling unit 420, and thus detect that the vehicle main body 30 and the vehicular lamp main body 40 are electrically connected through the control cable 402 and the power cables 400 and 404. In addition, in another example, the lighting controlling unit 420 may light the LED module 100 when power is supplied from the power source 32.

Here, the lighting controlling unit 420 receives electric power through the power cables 400 and 404, and receives the modulated light signal through the control cable 402. Therefore, the control cable 402 transmits small electric power in comparison with the power cables 400 and 404. In this way, since the control cable 402 may be a cable having small current capacity, it is possible to use a thin control cable 402 compared with the power cables 400 and 404. Therefore, since stray capacitance of the control cable 402 can be reduced, it is possible to transmit the modulated light signal to the lighting controlling unit 420 more quickly.

Thus, since the signals generated from the control unit 38 and the vehicular lamp main body 40 can respectively be transmitted to different directions via one control cable 402, it is possible to use the small number of cables for transmitting a signal. In this way, the vehicular lamp 10 can be miniaturized. Furthermore, since the number of cables decreases, the vehicle main body 30 and the vehicular lamp 10 can easily be attached to each other, and also a wrong connection between the cables can be prevented.

In addition, it is preferable that a resistance value of the resistor 440 is, e.g., about 1/1000 of input impedance of the terminal 422. In this way, a difference between a current value flowing into the resistor 364 when the LED module 100 is disconnected and a current value flowing into the resistor 364 when the LED module 100 is not disconnected can be made larger. Therefore, it is possible to prevent the disconnection detecting unit 360 from detecting disconnection by noise by mistake.

In addition, the resistor 440 may be a thermistor that changes a resistance value according to temperature. In this case, it is preferable that the resistor 440 is disposed in the vicinity of the LED module 100. In this way, a resistance value of the resistor 440 varies with a temperature change of the LED module 100. For that purpose, with a temperature change of the LED module 100, the current flowing into the resistor 364 varies, and thus a potential difference on both ends of the resistor 364 varies. Therefore, the disconnection detecting unit 360 can detect a temperature change of the LED module 100. Here, when the temperature of the LED module 100 rises, a light amount of the LED module 100 can be reduced in some cases. However, according to this example, since degradation of the light amount of the LED module 100 by a temperature rise of the LED module 100 can be detected, it is possible to cause the vehicular lamp 10 to irradiate light having a constant light amount by applying the DC voltage by which the light amount of the LED module 100 is increased to the lighting controlling unit 420 by the modulated light signal generating unit 34 or by increasing the number of LED modules 100 to be turned on.

In addition, in this example, although the vehicular lamp main body 40 has one load unit 42, in another example, the vehicular lamp main body 40 may have a plurality of load units 42. Here, assuming that a signal line for transmitting a modulated light signal and a signal line for giving notice of disconnection of the LED module 100 are separately provided in the vehicular lamp 10, the number of signal lines must be two times of the number of lighting controlling units 420 that each of the plurality of load units 42 has. However, in this example, since the signals generated from the control unit 38 and the vehicular lamp main body 40 can respectively be transmitted to different directions via one control cable 402, the number of control cables 402 can be equal to the number of lighting controlling units 420.

In this case, it is also preferable that power sources of the plurality of lighting controlling units 420 are connected in parallel in the vehicular lamp main body 40. In this way, it is possible to supply electric power to the plurality of load units 42 without increasing the power cables 400 and 404 that connect the vehicle main body 30 and the vehicular lamp main body 40. In addition, the current driving unit 44 and the control cable 402 are provided corresponding to each of the plurality of load units 42. In this case, since the plurality of control cables can be made using a flat cable, it is possible to increase intensity of the control cable 402 thinner than the power cables 400 and 404 and also reduce man-hours when connecting each of the control cables 402 to the vehicular lamp main body 40. In addition, when the vehicular lamp main body 40 has the plurality of load units 42 and the current driving units 44, one control cable 402 may transmit a signal based on the current from the plurality of current driving units 44 to the vehicle main body 30. In this case, the disconnection detecting unit 360 detects the number of load units including the disconnected LED module 100 according to potential difference generated in the resistor 364.

In addition, the control unit 38 is an example of a first device in the present invention, the vehicular lamp main body 40 is an example of a second device in the present invention, and the control unit 38, the vehicular lamp main body 40, and the control cable 402 are an example of a signal transmission system in the present invention. Further, in this example, although the load unit 42 changes consumption current according to the voltage received from the control unit 38, in another example, the load unit 42 may change consumption current according to the current being supplied. In this case, the current driving unit is provided in the control unit 38, and a voltage signal feeding unit is provided in the vehicular lamp main body 40. Then, the load unit 42 changes consumption current according to the current flowed into the control cable 402 by the current driving unit, and the voltage signal feeding unit applies the voltage according to the consumption current changed by the load unit 42 to the control cable 402. Then, the signal detecting unit 36 detects the voltage of the control cable 402 to receive the signal from the vehicular lamp main body 40. In this example, it is possible to respectively transmit the signals generated from the control unit 38 and the vehicular lamp main body 40 to different directions via one control cable 402.

In addition, in this example, although the vehicular lamp main body 40 receives a modulated light signal and also sends a signal to indicate disconnection via the control cable 402, and receives electric power from the power source 32 via the power cables 400 and 404, in another example, the lighting controlling unit 420 may receive a modulated light signal and electric power supplied from the vehicle main body 30 via the control cable 402 and supply a predetermined target current based on the received voltage value to the LED module 100. In this case, the vehicular lamp main body 40 receives electric power via the control cable 402 in addition to a modulated light signal and a signal to indicate disconnection. In this way, the number of wires that connect the vehicle main body 30 and the vehicular lamp main body 40 is two, i.e., the control cable 402 and the power cable 404, and thus the number of signal lines can further be reduced.

Furthermore, in another example, the control cable 402 and the LED module 100 may be connected through a source terminal and a drain terminal of a field effect transistor. In this case, the LED module 100 is turned on by a light amount according to the current received from the vehicle main body 30 when the voltage applied to the gate terminal of the field effect transistor is, e.g., High. Then, since the voltage between High and Low is applied to the gate terminal of the field effect transistor, the voltage drop according to the voltage applied to the gate terminal of the field effect transistor is generated between the control cable 402 and the LED module 100, and the vehicle main body 30 receives a voltage that is obtained by adding the voltage drop of the field effect transistor to the forward voltage of the LED module 100 via the control cable 402. In this way, the vehicular lamp main body 40 can transmit the DC voltage applied to the gate terminal of the field effect transistor to the vehicle main body 30 as a signal. In this example, the number of wires that connect the vehicle main body 30 and the vehicular lamp main body 40 is two, i.e., the control cable 402 and the power cable 404, and thus the number of signal lines can be reduced.

Figure 4:
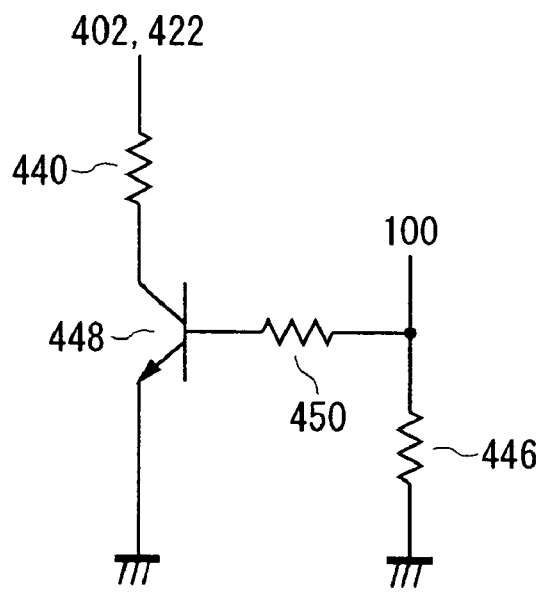
FIG. 4 is a view showing another example of a circuit configuration of a current driving unit.

FIG. 4 is a view showing another example of a circuit configuration of the current driving unit 44. The current driving unit 44 includes an NPN transistor 448 and a resistor 450 instead of the comparator 442 and the constant voltage source 444 explained in FIG. 3. One end of the resistor 450 is connected to a node between the resistor 446 and the LED module 100, and another end is connected to a base terminal of the NPN transistor 448. A collector terminal of the NPN transistor 448 is connected to the resistor 440, and an emitter terminal of the NPN transistor 448 is connected to reference potential. When the LED module 100 is lighted, since the resistor 446 applies the voltage generated by the current flowing into the LED module 100 to a base terminal of the NPN transistor 448 via the resistor 450, the NPN transistor 448 is kept on. In this case, the NPN transistor 448 sinks the current flowing into the resistor 364 via the resistor 440 to reference potential. In this example, the current driving unit 44 also allows the disconnection detecting unit 360 to detect disconnection of the LED module 100 adequately.

Figure 5:
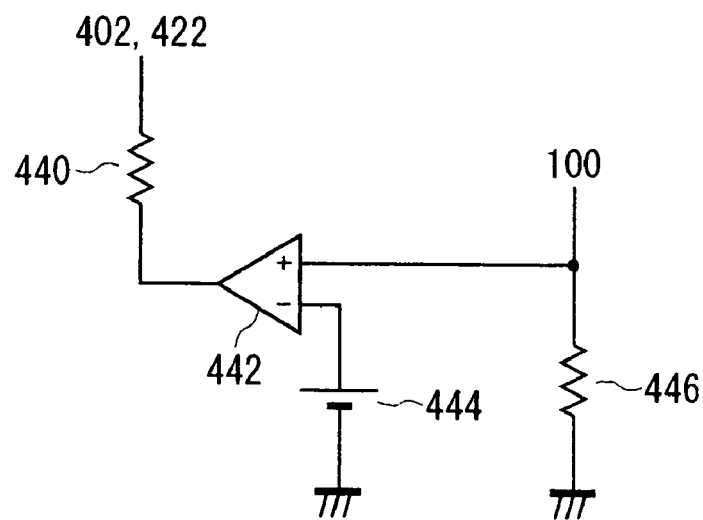
FIG. 5 is a view showing further another example of a circuit configuration of the current driving unit.

FIG. 5 is a view showing further another example of a circuit configuration of the current driving unit 44. In addition, since the components of FIG. 5 having the same reference numbers as the current driving unit 44 of FIG. 3 have the same or similar functions as or to the current driving unit 44 of FIG. 3, their descriptions will be omitted. In this example, the comparator 442 receives the voltage of the constant voltage source 444 through a negative input terminal, and receives the voltage generated on the resistor 446 through a positive input terminal. In this example, when the LED module 100 is lighted, the output terminal of the comparator 442 becomes high impedance, and thus a current does not flow into the resistor 440. In addition, when either of the plurality of LED modules 100 is disconnected, since a voltage is not generated on the resistor 446, the comparator 442 sinks the current flowing into the resistor 364 via the control cable 402 and the resistor 440. In this way, when a potential difference generated on both ends of the resistor 364 is large, the disconnection detecting unit 360 can detect disconnection of the LED module 100.

Thus, sine a large current is flowed into the resistor 440 and the resistor 364 when detecting disconnection of the LED module 100, it is possible to reduce power consumption of a vehicle when the LED module 100 is not disconnected. Further, since a current is not flowed into the resistor 440 when the LED module 100 is not disconnected, temperature of the vehicular lamp 10 does not rise by means of heat generated by the resistor 440. Therefore, it is possible to suppress a temperature rise of the LED module 100 and thus to suppress a fall of a light amount of the LED module 100 by a temperature rise of the LED module 100.

As is apparent from the description, according to the present embodiment, it is possible to provide a vehicular lamp 10 that can be miniaturized by reducing a signal line connected to the vehicular lamp 10.

Although the present invention has been described by way of an exemplary embodiment, it should be understood that those skilled in the art might make many changes and substitutions without departing from the spirit and the scope of the present invention. It is obvious from the definition of the appended claims that embodiments with such modifications also belong to the scope of the present invention.

What is claimed is:

1. A signal transmission system that transmits a signal, comprising:
    a first device having a first terminal;
    a second device having a second terminal; and
    a signal line that connects said first terminal of said first device and said second terminal of said second device, wherein
    said first device sends a signal to said second device using a voltage applied to said signal line, and
    said second device sends a signal to said first device using an electric current flowing into said signal line.

2. The signal transmission system as claimed in claim 1, wherein on e of said first device and said second device has a load unit that is driven by electric power received from the outside of the signal transmission system, and the load unit changes a consumption current according to the signal received from the other of said first device and said second device via said signal line.

3. The signal transmission system as claimed in claim 2, wherein said second device has the load unit, the load unit changes the consumption current according to the voltage applied from said first device to said signal line, and said second device sends an electric current according to the consumption current of the load unit to said first device via said signal line as the signal.

4. The signal transmission system as claimed in claim 1, wherein said first device supplies electric power to said second device via said signal line to drive said second device.

5. A signal transmission system that transmits a signal, comprising:
    a first device having a first terminal;
    a second device having a second terminal; and
    a signal line that connects said first terminal of said first device and said second terminal of said second device, wherein
    said first device sends a signal to said second device using a voltage applied to said signal line, and
    said second device sends a signal to said first device using an electric current flowing into said signal line,
    wherein one of said first device and said second device has a load unit that is driven by electric power received from the outside of the signal transmission system, and the load unit changes a consumption current according to the signal received from the other of said first device and said second device via said signal line,
    wherein said second device has the load unit, the load unit changes the consumption current according to the voltage applied from said first device to said signal line, and said second device sends an electric current according to the consumption current of the load unit to said first device via said signal line as the signal,
    wherein said load unit comprises:
        a semiconductor light-emitting element; and
        a lighting controlling unit that controls an electric current supplied to the semiconductor light-emitting element according to the voltage applied to said signal line in order to control a light amount of the semiconductor light-emitting element, and
    wherein said second device comprises:
        a current detecting resistor that is connected to the semiconductor light-emitting element in series; a current driving resistor that is connected to said signal line in series; and
        a comparator that sinks the current flowing into said signal line according to the voltage generated on the current detecting resistor by the current flowing into the semiconductor light-emitting element.

6. The signal transmission system as claimed in claim 5, wherein said current driving resistor is a thermistor that changes a resistance value according to temperature, and is disposed in the vicinity of the semiconductor light-emitting element.

7. The signal transmission system as claimed in claim 5, wherein said first device further comprises a disconnection detecting unit connected to said signal line, and wherein said disconnection detecting unit detects unit an existence of disconnection of said semiconductor light-emitting element when said comparator does not sink the current flowing into said line.

8. The signal transmission system as claimed in claim 5, wherein said first device further comprises a disconnection detecting unit which is connected to said signal line and wherein said disconnection detecting unit detects an existence of disconnection of said semiconductor light-emitting element when said comparator sinks the current flowing into said signal line.

9. A vehicular lamp that is used for a vehicle, comprising:
a light source unit having a first terminal;
a light source controlling unit for controlling lighting of said light source unit, said controlling unit having a second terminal; and
a signal line that connects said first terminal of said light source unit and said second terminal of said light source controlling unit, wherein said light source unit comprises:
a semiconductor light-emitting element;
an optical member that irradiates light emitted from said semiconductor light-emitting element to the outside of the vehicle;
a lighting controlling unit to which electric power is supplied from a vehicle main body and that control an electric current supplied to said semiconductor light-emitting element according to a voltage applied to said signal line by the light source controlling unit in order to control a light amount of said semiconductor light-emitting element;
a current detecting resistor that is connected to said semiconductor light-emitting element in series;
a current driving resistor that is connected to said signal line in series; and
a comparator that sinks the current flowing into the current driving resistor and said same signal line as said signal line when a voltage is generated on the current detecting resistor by the current flowing into the semiconductor light-emitting element.

10. The vehicular lamp as claimed in claim 9, wherein the vehicular lamp comprises a plurality of light source units,
said light source controlling unit controls lighting of each of said plurality of light source units, and
said signal line connects each of said plurality of light source units and the light source controlling unit in the vehicular lamp.

11. The vehicular lamp as claimed in claim 9, wherein said light source further comprises a disconnection detecting unit connected to said signal line, and wherein said disconnection detecting unit detects an existence of disconnection of said semiconductor light-emitting element when said comparator does not sink the current flowing into said signal line.

12. The vehicular lamp as claimed in claim 9, wherein said light source further comprises a disconnection detecting unit which is connected to said signal line and wherein said disconnection detecting unit detects an existence of disconnection of said semiconductor light-emitting element when said comparator sinks the current flowing into said signal line.

* * * * *

UNITED STATES PATENT AND TRADEMARK OFFICE
CERTIFICATE OF CORRECTION

| | | |
|---|---|---|
| PATENT NO. | : 7,294,968 B2 | Page 1 of 1 |
| APPLICATION NO. | : 11/079429 | |
| DATED | : November 13, 2007 | |
| INVENTOR(S) | : Masayasu Ito et al. | |

It is certified that error appears in the above-identified patent and that said Letters Patent is hereby corrected as shown below:

In Claim 2, column 10, line 14, the word "on e" should be --one--.

In Claim 9, column 12, line 10, the words "said same signal line as" should be deleted.

Signed and Sealed this

Fifth Day of May, 2009

JOHN DOLL
*Acting Director of the United States Patent and Trademark Office*